(12) United States Patent
Zhang

(10) Patent No.: US 11,193,406 B2
(45) Date of Patent: Dec. 7, 2021

(54) DIESEL ENGINE WITH A DIESEL PARTICULATE FILTER

(71) Applicant: Vitesco Technologies GmbH, Hannover (DE)

(72) Inventor: Hong Zhang, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 16/755,528

(22) PCT Filed: Oct. 8, 2018

(86) PCT No.: PCT/EP2018/077245
§ 371 (c)(1),
(2) Date: Apr. 10, 2020

(87) PCT Pub. No.: WO2019/072726
PCT Pub. Date: Apr. 18, 2019

(65) Prior Publication Data
US 2021/0189931 A1    Jun. 24, 2021

(30) Foreign Application Priority Data
Oct. 13, 2017   (DE) ..................... 10 2017 218 307.1

(51) Int. Cl.
*F01N 3/035* (2006.01)
*F01N 13/00* (2010.01)
(Continued)

(52) U.S. Cl.
CPC ......... *F01N 3/035* (2013.01); *B01D 46/0061* (2013.01); *B01D 53/944* (2013.01); *B01D 53/9418* (2013.01); *B01D 53/9431* (2013.01); *B01D 53/9477* (2013.01); *B01D 53/9495* (2013.01); *F01N 3/0231* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 6,871,489 B2 | 3/2005 | Tumati et al. | 60/285 |
| 7,451,593 B2 | 11/2008 | Nagaoka et al. | 60/295 |

(Continued)

FOREIGN PATENT DOCUMENTS

| | | | | |
|---|---|---|---|---|
| DE | 102006062515 A1 | 7/2008 | | F01N 11/00 |
| DE | 102009000148 A1 | 7/2010 | | F01N 11/00 |

(Continued)

OTHER PUBLICATIONS

German Office Action, Application No. 102017218307.1, 9 pages, dated Jun. 15, 2018.

(Continued)

*Primary Examiner* — Binh Q Tran
(74) *Attorney, Agent, or Firm* — Slayden Grubert Beard PLLC

(57) ABSTRACT

Various embodiments include a diesel engine comprising: an exhaust gas line; a diesel particulate filter arranged in the exhaust gas line; a first NO sensor arranged in the exhaust gas line upstream of the diesel particulate filter; and a second NO sensor arranged in the exhaust gas line downstream of the diesel particulate filter.

6 Claims, 2 Drawing Sheets

(51) Int. Cl.
   *B01D 46/00* (2006.01)
   *B01D 53/94* (2006.01)
   *F01N 3/023* (2006.01)
   *F01N 3/20* (2006.01)
   *F02D 41/02* (2006.01)
   *F02D 41/14* (2006.01)

(52) U.S. Cl.
   CPC ........... *F01N 3/208* (2013.01); *F01N 13/008* (2013.01); *F01N 13/009* (2014.06); *F02D 41/029* (2013.01); *F02D 41/1461* (2013.01); *F02D 41/1463* (2013.01); *B01D 2255/904* (2013.01); *B01D 2279/30* (2013.01); *F01N 2560/026* (2013.01); *F01N 2560/14* (2013.01); *F01N 2900/1402* (2013.01); *F01N 2900/16* (2013.01)

(56) References Cited

U.S. PATENT DOCUMENTS

| | | | |
|---|---|---|---|
| 8,562,924 B1 | 10/2013 | Roberts, Jr. | 423/213.2 |
| 8,596,045 B2 | 12/2013 | Tuomivaara et al. | 60/295 |
| 8,682,595 B2 | 3/2014 | Zanetti et al. | 702/24 |
| 8,813,546 B2 | 8/2014 | Takahashi et al. | 73/114.71 |
| 8,869,513 B2 | 10/2014 | Levijoki et al. | 60/286 |
| 9,145,842 B2 | 9/2015 | Takahashi et al. | |
| 9,422,847 B2 | 8/2016 | Osburn et al. | |
| 9,494,096 B2 | 11/2016 | Pfaffinger | |
| 9,581,099 B1 | 2/2017 | Szailer et al. | |
| 9,765,674 B2* | 9/2017 | Khaled | B01D 53/9418 |
| 10,094,261 B2 | 10/2018 | Hibino et al. | |
| 10,287,959 B2 | 5/2019 | Maletic et al. | |
| 10,662,843 B2* | 5/2020 | Bahrami | F01N 3/2066 |
| 2006/0263285 A1 | 11/2006 | Pollington et al. | 423/239.1 |
| 2010/0024390 A1* | 2/2010 | Wills | F01N 3/208 60/274 |
| 2010/0175368 A1 | 7/2010 | Schulze et al. | 60/273 |
| 2011/0016848 A1 | 1/2011 | Brooks et al. | 60/274 |
| 2011/0072798 A1 | 3/2011 | Herman | 60/286 |
| 2012/0017568 A1* | 1/2012 | Geveci | F01N 13/0093 60/274 |
| 2013/0232958 A1* | 9/2013 | Ancimer | B01D 53/9418 60/301 |
| 2015/0143799 A1* | 5/2015 | Lee | F01N 3/0885 60/274 |
| 2016/0177804 A1* | 6/2016 | Matsumoto | F01N 3/0814 60/277 |
| 2016/0186629 A1* | 6/2016 | Osburn | F01N 3/18 60/274 |
| 2016/0186630 A1* | 6/2016 | Osburn | F01N 3/2066 60/274 |
| 2018/0258821 A1* | 9/2018 | Masubuchi | F01N 3/208 |

FOREIGN PATENT DOCUMENTS

| | | | |
|---|---|---|---|
| DE | 102011003084 A1 | 7/2012 | ............. F01N 11/00 |
| DE | 102014100766 A1 | 7/2015 | ............. F01N 11/00 |
| DE | 102014203621 A1 | 8/2015 | ............. F01N 11/00 |
| DE | 102016006829 A1 | 12/2016 | ............. F01N 11/00 |
| EP | 2832965 A1 | 2/2015 | ............. F01N 11/00 |
| WO | 2019/072726 A1 | 4/2019 | ............. F01N 13/00 |

OTHER PUBLICATIONS

International Search Report and Written Opinion, Application No. PCT/EP2018/077245, 15 pages, dated Nov. 29, 2018.

\* cited by examiner

DIESEL ENGINE WITH A DIESEL PARTICULATE FILTER

CROSS-REFERENCE TO RELATED APPLICATIONS

This application is a U.S. National Stage Application of International Application No. PCT/EP2018/077245 filed Oct. 8, 2018, which designates the United States of America, and claims priority to DE Application No. 10 2017 218 307.1 filed Oct. 13, 2017, the contents of which are hereby incorporated by reference in their entirety.

TECHNICAL FIELD

The present disclosure concerns diesel engines. Various embodiments of the teachings herein may include diesel engines with an exhaust gas line and a diesel particulate filter arranged in the exhaust gas line.

BACKGROUND

A diesel particulate filter (DPF), also known as diesel soot particle filter (DRPF), soot particle filter (RPF), or particulate filter, is a device for reducing the particles present in the exhaust gas. Such filters must be regenerated at certain intervals. Various regeneration processes are typically used for this.

One process is catalytically supported regeneration. Here, the filter is catalytically coated similarly to an oxidation catalyst. In passive regeneration at sufficiently high temperatures and $NO_2$ concentrations, a permanent conversion of the soot into $CO_2$ and nitrogen monoxide (NO) takes place. This procedure takes place at a temperature range from 350-500° C. and proceeds without separate measures following the principle of a "Continuous Regeneration Trap" (CRT). For this, an upstream oxidation catalyst or the catalytically active filter coating converts the nitrogen monoxide (NO) present in the exhaust gases together with the residual oxygen ($O_2$) into nitrogen dioxide ($NO_2$). This nitrogen dioxide then allows continuous combustion of the soot which has collected in the particulate filter into carbon dioxide ($CO_2$) and nitrogen monoxide (NO).

In this regeneration process, nitrogen dioxide ($NO_2$) is used for continuous soot particle regeneration in a diesel particulate filter even at low particulate filter temperatures (via the CRT effect). The temperature in the diesel particulate filter and the $NO_2$ concentration upstream of the diesel particulate filter thus constitute important factors for the regeneration efficiency of the filter. A precise determination of the CRT effect is therefore extremely important for the regeneration efficiency in order to reduce the corresponding regeneration frequency and hence reduce the emission of $CO_2$. Furthermore, precise determination of the CRT effect is important in order to delay ageing of the diesel particulate filter.

Typically, the corresponding regeneration strategy depends on the soot accumulation level in the diesel particulate filter. This is modelled as a function of the crude soot emissions, the CRT efficiency, and the trap efficiency of the diesel particulate filter. Under real driving conditions however, it is very difficult to determine the CRT efficiency precisely, since very great fluctuations in the corresponding $NO_X$ levels can occur depending on temperature and ageing conditions. This dependency also arises from the corresponding operating conditions.

SUMMARY

The teachings of the present disclosure include diesel engines of the type mentioned at the outset, by means of which the CRT effect of the diesel particulate filter can be detected particularly precisely. For example, some embodiments of the teachings herein include a diesel engine of the type cited initially in that an NO sensor is arranged in the exhaust gas line upstream of the diesel particulate filter, and an NO sensor is arranged in the exhaust gas line downstream of the diesel particulate filter.

As another example, some embodiments include a diesel engine with an exhaust gas line (1) and a diesel particulate filter (2) arranged in the exhaust gas line (1), characterized in that an NO2 sensor (4) is arranged in the exhaust gas line (1) upstream of the diesel particulate filter (2) and an NO2 sensor (5) is arranged in the exhaust gas line (1) downstream of the diesel particulate filter (2).

In some embodiments, both an NO sensor (3) and an NO2 sensor (4) are arranged in the exhaust gas line (1) upstream of the diesel particulate filter (2).

In some embodiments, both an NO sensor (6) and an NO2 sensor (5) are arranged in the exhaust gas line (1) downstream of the diesel particulate filter (2).

In some embodiments, an SCR catalyst is arranged in the exhaust gas line (1) downstream of the diesel particulate filter (2), wherein an NO sensor and an NO2 sensor are arranged upstream of the SCR catalyst.

In some embodiments, a diesel oxidation catalyst (7) is arranged in the exhaust gas line (1) upstream of the diesel particulate filter (2), wherein either an NO sensor (9) or an NO2 sensor (10) are arranged upstream and downstream of the diesel oxidation catalyst (7).

In some embodiments, an NOx sensor (8) is provided in the exhaust gas line (1) upstream of the diesel oxidation catalyst (7).

In some embodiments, a diesel oxidation catalyst (7), a diesel particulate filter (2) and an SCR catalyst are arranged in the exhaust gas line (1) successively in the flow direction, wherein an NO sensor (9) and an NO2 sensor (10) in each case are arranged in the exhaust gas line (1) upstream of the diesel oxidation catalyst (7), and between the diesel oxidation catalyst (7) and the diesel particulate filter (2), and between the diesel particulate filter (2) and the SCR catalyst.

As another example, some embodiments include a method for operating a diesel engine which comprises an exhaust gas line (1) and a diesel particulate filter (2) arranged in the exhaust gas line (1), with the following steps: measuring the NO concentration in the exhaust gas line (1) upstream of the diesel particulate filter (2); measuring the NO concentration in the exhaust gas line (1) downstream of the diesel particulate filter (2); and using the obtained signals to form the difference between the NO concentration downstream and upstream of the diesel particulate filter (2) in order to determine the quantity of particles reduced by the CRT effect.

As another example, some embodiments include a method for operating a diesel engine which comprises an exhaust gas line (1) and a diesel particulate filter (2) arranged in the exhaust gas line (1), with the following steps: measuring the NO2 concentration in the exhaust gas line (1) upstream of the diesel particulate filter (2); measuring the NO2 concentration in the exhaust gas line (1) downstream of the diesel particulate filter (2); and using the obtained signals to form the difference between the NO2 concentration downstream and upstream of the diesel particulate filter (2) in order to determine the quantity of particles reduced by the CRT effect.

In some embodiments, the NOx concentration is measured upstream of the diesel particulate filter (2) and from this the NO2/NOx ratio downstream of the diesel particulate filter (2) is determined.

BRIEF DESCRIPTION OF THE DRAWINGS

The teachings of the present disclosure are explained in detail hereunder by means of exemplary embodiments in conjunction with the drawings. The drawings show.

DETAILED DESCRIPTION

Figure 1:
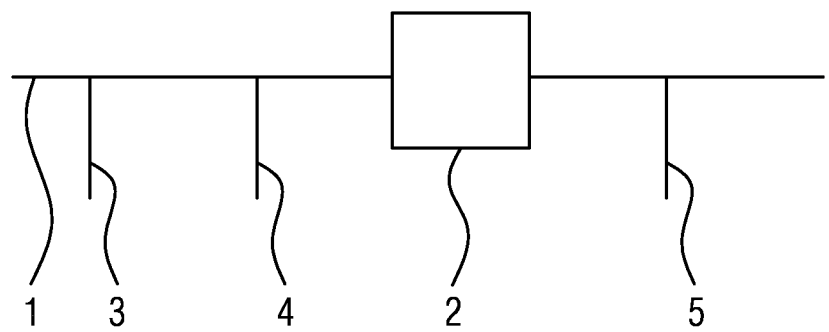
FIG. 1 a schematic illustration of an exhaust gas line of a diesel engine incorporating teachings of the present disclosure.

In some embodiments, a diesel engine comprises an exhaust gas line and a diesel particulate filter arranged in the exhaust gas line, which is characterized in that an $NO_2$ sensor is arranged in the exhaust gas line upstream of the diesel particulate filter, and an $NO_2$ sensor is arranged in the exhaust gas line downstream of the diesel particulate filter.

The term "NO" used here means nitrogen monoxide, "$NO_2$" means nitrogen dioxide, and "$NO_x$" means nitrogen monoxide plus nitrogen dioxide. "CRT" means Continuous Regeneration Trap, i.e. the principle of a continuously regenerating particle trap. "DPF" means diesel particulate filter. The terms "DOC" (diesel oxidation catalyst) and "SCR" (selective catalytic reduction) and "SCR catalyst" (a catalyst using the SCR process) are also used below.

Some embodiments include a method for operating a diesel engine which comprises an exhaust gas line and a diesel particulate filter arranged in the exhaust gas line, the method comprising:
measuring the NO concentration in the exhaust gas line upstream of the diesel particulate filter;
measuring the NO concentration in the exhaust gas line downstream of the diesel particulate filter; and
using the obtained signals to form the difference between the NO concentration downstream and upstream of the diesel particulate filter in order to determine the quantity of particles reduced by the CRT effect.

In some embodiments, a method comprises the following steps:
measuring the $NO_2$ concentration in the exhaust gas line upstream of the diesel particulate filter;
measuring the $NO_2$ concentration in the exhaust gas line downstream of the diesel particulate filter; and
using the obtained signals to form the difference between the $NO_2$ concentration downstream and upstream of the diesel particulate filter in order to determine the quantity of particles reduced by the CRT effect.

In some embodiments, methods include determining the CRT efficiency of the diesel particulate filter by the arrangement of corresponding NO and/or $NO_2$ sensors and by performing corresponding NO and/or $NO_2$ concentration measurements with these sensors upstream and downstream of a diesel particulate filter. Furthermore, the efficiency values determined are used to control the active regeneration of the diesel particulate filter. The following procedure is applied:

In some embodiments, when an NO sensor is used upstream and downstream of the diesel particulate filter, the rise in NO downstream of the diesel particulate filter is determined, namely the difference between the NO signal downstream of the diesel particulate filter and upstream of the diesel particulate filter. This value is used to establish how many particles (soot particles) have been reduced by the CRT effect.

In some embodiments, both an NO sensor and an $NO_2$ sensor are arranged in the exhaust gas line upstream of the diesel particulate filter. The $NO_2/NO_x$ ratio downstream of the diesel particulate filter can thereby be determined as follows:

$$NO_2\_a/NO_x\_a = 1 - NO\_a/(NO\_b + NO_2\_b),$$

wherein:
$NO_2\_a$, $NO\_a = NO_2$ or NO concentration downstream of the diesel particulate filter,
$NO_2\_b$, $NO\_b = NO_2$ or NO concentration upstream of the diesel particulate filter.

In some embodiments, in which an $NO_2$ sensor is used upstream and downstream of the diesel particulate filter, the fall in $NO_2$ downstream of the diesel particulate filter, i.e. the difference between the $NO_2$ signal upstream and downstream of the diesel particulate filter, can be used to determine how many particles (soot particles) have been reduced by the CRT effect. Here too, as in the variant described above in which both an $NO_2$ sensor and an NO sensor are arranged upstream of the diesel particulate filter, the $NO_2/NO_x$ ratio downstream of the diesel particulate filter can be determined as follows:

$$NO_2\_a/NO_x\_a = NO_2\_a/(NO\_b + NO_2\_b).$$

In some embodiments, an SCR catalyst is arranged in the exhaust gas line downstream of the diesel particulate filter, wherein an NO sensor and an $NO_2$ sensor are arranged upstream of the SCR catalyst. In these embodiments, the $NO_2/NO_x$ ratio downstream of the diesel particulate filter can be determined, which is then used to control the correct SCR urea addition.

In some embodiments, a diesel oxidation catalyst is arranged in the exhaust gas line upstream of the diesel particulate filter, wherein an $NO_x$ sensor is arranged upstream of the diesel oxidation catalyst, and either an NO sensor or an $NO_2$ sensor is arranged upstream and downstream of the diesel particulate filter. In these embodiments, the soot particle reduction by the CRT effect can be determined in the same way as in the embodiment described above, in which an NO and/or an $NO_2$ sensor is arranged upstream and an $NO_2$ sensor or an NO sensor is arranged downstream of the diesel particulate filter. The total $NO_x$ concentration measured upstream of the diesel particulate filter is used purely to determine the $NO_2/NO_x$ ratio. With this configuration, in addition the conversion efficiency of the diesel oxidation catalyst, from the NO or $NO_2$ measurement upstream of the diesel particulate filter in comparison with the $NO_x$ upstream of the diesel oxidation catalyst, can be used for supply gas diagnosis of the diesel oxidation catalyst.

The $NO_2/NO_x$ ratio upstream of the SCR catalyst may also be used for active temperature management of the diesel particulate filter and/or diesel oxidation catalyst. If the $NO_2/NO_x$ ratio is too high (i.e. above 50%), the temperature of the diesel oxidation catalyst should be reduced, for example by a reduction in EGR (exhaust gas recirculation) or via a shift in the combustion centre point towards a higher combustion efficiency. If the $NO_2/NO_x$ ratio is too low (i.e. below 20%), the temperature of the diesel oxidation catalyst should be increased, for example by an increase in EGR or by delaying the combustion centre point towards a lower combustion efficiency.

In some embodiments, a diesel oxidation catalyst, a diesel particulate filter and an SCR catalyst are arranged in the exhaust gas line successively in the flow direction, wherein an NO sensor and an $NO_2$ sensor in each case are arranged in the exhaust gas line upstream of the diesel oxidation catalyst, and between the diesel oxidation catalyst and the diesel particulate filter, and between the diesel particulate filter and the SCR catalyst.

As shown in FIG. 1, the exhaust gas of a diesel engine is conducted from left to right in the figure via an exhaust gas line 1. The exhaust gas thus passes through a diesel particulate filter 2 which is formed in a suitable and known fashion. An NO sensor 3 and an $NO_2$ sensor 4 are arranged in the exhaust gas line upstream of the diesel particulate filter 2. A further $NO_2$ sensor 5 is arranged in the exhaust gas line downstream of the diesel particulate filter 2.

By means of the two $NO_2$ sensors 4 and 5, the reduction in $NO_2$ in the exhaust gas line after passing through the diesel particulate filter is measured (difference between the $NO_2$ signal upstream and downstream of the diesel particulate filter) in order to establish the quantity of particles (soot quantity) reduced by the CRT effect. In addition, the $NO_2/NO_x$ ratio downstream of the diesel particulate filter is calculated.

Figure 2:
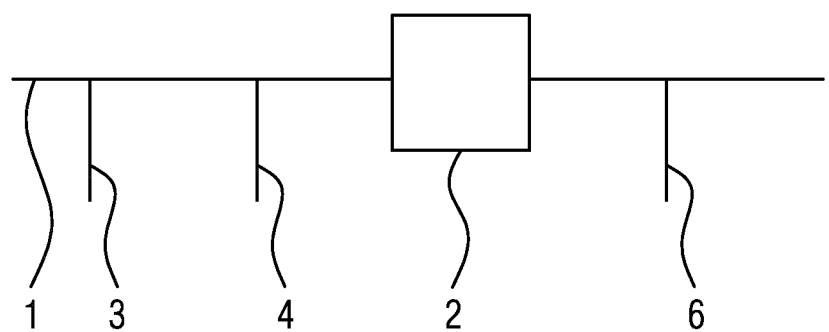
FIG. 2 a depiction of a second embodiment of an exhaust gas line incorporating teachings of the present disclosure.

In the embodiment shown in FIG. 2, an NO sensor 3 and an $NO_2$ sensor 4 are situated upstream of the diesel particulate filter 2, while an NO sensor 6 is arranged in the exhaust gas line downstream of the diesel particulate filter 2. This arrangement measures the rise in NO downstream of the diesel particulate filter (difference between the NO signal downstream and upstream of the diesel particulate filter), which is used to establish the quantity of particles reduced by the CRT effect. In addition, the $NO_2/NO_x$ ratio downstream of the diesel particulate filter is determined by calculation.

Figure 3:
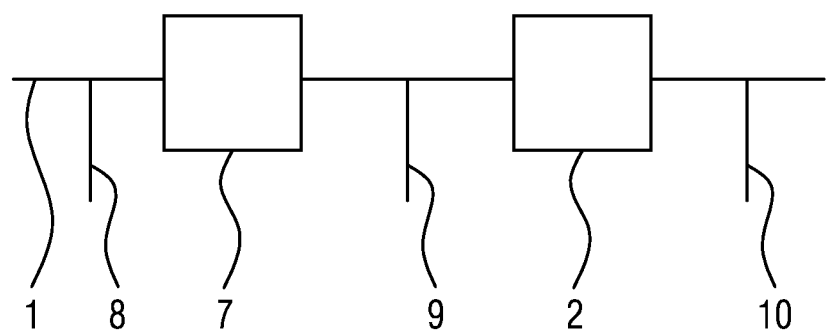
FIG. 3 a depiction of a third embodiment of an exhaust gas line incorporating teachings of the present disclosure.

FIG. 3 shows an embodiment in which a diesel oxidation catalyst 7 is arranged in the exhaust gas line 1 upstream of the diesel particulate filter 2. Here, an $NO_x$ sensor 8 is arranged in the exhaust gas line 1 upstream of the diesel oxidation catalyst 7. Either an NO sensor or an $NO_2$ sensor 9, 10 is arranged upstream and downstream of the diesel particulate filter 2. Here, the reduction in particle quantity by the CRT effect is determined in a similar manner to the procedure in FIGS. 1 and 2. The total $NO_x$ concentration measured upstream of the diesel oxidation catalyst 7 is used only to determine the $NO_2/NO_x$ ratio. With this configuration, in addition the DOC conversion efficiency, from the NO or $NO_2$ measurement upstream of the diesel particulate filter in comparison with the $NO_x$ upstream of the diesel oxidation catalyst, can be used for DOC supply gas diagnosis.

What is claimed is:

1. A diesel engine comprising:
    an exhaust gas line;
    a diesel particulate filter arranged in the exhaust gas line;
    a first NO sensor arranged in the exhaust gas line upstream of the diesel particulate filter;
    a second NO sensor arranged in the exhaust gas line downstream of the diesel particulate filter;
    a diesel oxidation catalyst arranged in the exhaust gas line upstream of the diesel particulate filter and between the first NO sensor and the second NO sensor; and
    an SCR catalyst;
    wherein the diesel oxidation catalyst, the diesel particulate filter, and the SCR catalyst are arranged in the exhaust gas line successively in the flow direction;
    the first NO sensor and a first NO2 sensor are arranged between the diesel oxidation catalyst and the diesel particulate filter; and
    the second NO sensor and a second NO2 sensor are arranged between the diesel particulate filter and the SCR catalyst.

2. The diesel engine as claimed in claim 1, further comprising an NO2 sensor arranged in the exhaust gas line upstream of the diesel particulate filter.

3. The diesel engine as claimed in claim 1, further comprising an NO2 sensor arranged in the exhaust gas line downstream of the diesel particulate filter.

4. The diesel engine as claimed in claim 1, further comprising an NOx sensor in the exhaust gas line upstream of the diesel oxidation catalyst.

5. A method for operating a diesel engine including an exhaust gas line and a diesel particulate filter arranged in the exhaust gas line, the method comprising:
    measuring a first NO concentration and a first NO2 concentration in the exhaust gas line upstream of the diesel particulate filter;
    measuring a second NO concentration and a second NO2 concentration in the exhaust gas line downstream of the diesel particulate filter; and
    calculating a first difference between the first NO concentration and the second NO concentration and a second difference between the first NO2 concentration and the second NO2 concentration to determine the quantity of particles reduced by the diesel particulate filter.

6. The method as claimed in claim 5, further comprising:
    measuring a NOx concentration upstream of the diesel particulate filter; and
    determining a NO2/NOx ratio downstream of the diesel particulate filter based on the measured NOx concentration.

* * * * *